United States Patent Office 2,776,948
Patented Jan. 8, 1957

2,776,948
SYNTHETIC RESINS DERIVED FROM HYDROXY-METHYLFURFURAL AND PHENOLS

Francis H. Snyder, Newtown, Conn., assignor to Dendrol, Inc., Memphis, Tenn., a corporation of Delaware No Drawing. Application August 3, 1953, Serial No. 372,172

10 Claims. (Cl. 260—54)

This invention relates to synthetic resins derived from hydroxymethylfurfural or crude solutions containing hydroxymethylfurfural and to processes of preparing same. More particularly the invention relates to synthetic resins derived from hydroxymethylfurfural and phenols.

More precisely the compound named above is 2,5-hydroxy-methyl-furfuraldehyde and has a structural formula:

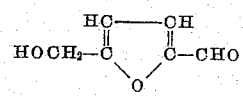

For brevity, it will be referred to as hydroxymethylfurfural.

In accordance with the invention, hydroxymethylfurfural is reacted with a phenol in a ratio of from about 1 to about 3 mols of hydroxymethylfurfural per mol of the phenol to produce thermo-setting resins of great activity and utility. Any of the phenols, such as hydroxybenzene, resorcinol, the cresols, mixtures of phenols and cresols, xylenols and others, as well as substituted phenols made by the hydrogenation of coal, alkylated phenols and the like may be employed for the purpose.

The reaction may be carried out by heating a mixture of hydroxymethylfurfural and a phenol in either an acid or alkaline medium until the desired condensation reactions have taken place, following which the resinous products may be recovered either by decantation or filtration, depending upon whether they are liquids or solids.

The hydroxymethylfurfural utilized herein may be in a purified form or alternatively may be in the form of a crude solution, such as the hydrolysate liquor resulting from the steam hydrolysis of acid impregnated wood, or other materials containing or yielding hexoses. In such process, wood, or other hexose containing or yielding material, is subjected to high pressure, high temperature hydrolysis with steam, in the presence of an acid, and under conditions of temperature, pressure, time and pH, so controlled, as to give a hydrolysate liquor, the major component of which, aside from water, is hydroxymethylfurfural. Depending on the particular materials used, the crude hydrolysate liquor may also contain small quantities of other hydrolysis products such as sugars, formic acid, acetic acid, levulinic acid and so forth.

Such hydrolysate liquor, in the raw state, has a pH below 3.0 and usually between about 2.5 and 2.9 and contains hydroxymethylfurfural in a concentration ranging from about 2 to 10%, which may be increased, if desired, by evaporation of a portion of the water. This material is well adapted for use in the process of the present invention and, in fact, constitutes a preferred source of hydroxymethylfurfural, since it can be produced rather economically, and used in the crude form obtained without further purification or other treatment. It can be used in dilute form, as obtained from the reactor, or alternatively may be concentrated by evaporation of a portion of the water to a soluble solids content of from about 25 to about 50 percent, and a hydroxymethylfurfural concentration of from about 40 to 50 percent.

In carrying out the process in an alkaline medium, hydroxymethylfurfural, either purified or in the form of a hydrolysate liquor, obtained as above described, is mixed with a phenol, and sufficient alkali added to give a pH between about 10 and about 11.5. Any suitable alkaline material, such as sodium hydroxide, potassium hydroxide, barium hydroxide, calcium hydroxide, magnesium hydroxide, ammonium hydroxide, and the like may be used. The mixture is then heated, with or without reflux, for a period of time from about 10 minutes to about 60 minutes, depending upon the type of product desired and the particular conditions of dilution, the more dilute conditions requiring the longer reaction times.

At the end of the required reaction period, the mixture is neutralized with dilute acid, such as hydrochloric, sulphuric, phosphoric or the like, whereupon the resins separate out as liquids or amorphous solids, depending upon the time of reaction, and the temperature at which precipitation is carried out. Longer reaction periods yield resins of higher molecular weight and these can be carried to a point where the products are either solids or liquids at ordinary temperatures, as desired. In either case the products are fusible, thermo-setting resins and may be recovered by decantation in the case of the liquid resins, or on filters if the products are solids.

In carrying out the process on the acid side, an aqueous solution of hydroxymethylfurfural is adjusted to a pH of approximately 2.0, more or less, by the addition of an acid such as sulphuric, hydrochloric, phosphoric, or the like, following which a phenol is added and the mixture then heated at about 90° C. for 1 to 2 hours. The mixture is then steamed distilled to remove the slight excess of phenol whereupon a dark oily resin separates. This resin is a true Novalac and has no tendency to cure or cross-link without the addition of hexamethylenetetramine or other cross-linking agent. Mixed with 5 to 10 parts of hexamethylenetetramine it provides a superior molding resin. It is also readily incorporated in rubber, acting as a reinforcing and plasticizing agent.

The following examples will serve to illustrate the invention. In these examples, the hydroxymethylfurfural utilized was contained in the crude hydrolysate liquor obtained by the steam hydrolysis of acid impregnated oak wood chips at a pressure of approximately 1000 pounds per square inch gauge for about 90 seconds. In some cases, the crude hydrolysate liquor was used without further treatment or concentration and in other cases the liquor was concentrated to varying degrees as shown by the percentage of soluble solids.

Example 1

100 mls. of crude hydrolysate liquor containing 2.4 percent solids and about 1.9 grams of hydroxymethylfurfural was mixed with 1.8 grams of phenol and sufficient sodium hydroxide added to yield a pH of 10.5. The mixture was refluxed above the solution for 50 minutes and then acidified to a pH below 2 with a dilute solution of hydrochloric acid. An oily resin separated out and was collected by bringing the mixture to a boil and then pouring off the supernatant liquor. This was accompanied by a faint odor of phenol indicating that all of the phenol had not reacted. The resin was washed with hot water, dissolved in acetone, and the acetone removed on a steam bath. The yield of resin was 1.9 grams.

Example 2

100 mls. of crude hydrolysate liquor containing 10 percent solids and approximately 8 grams of hydroxymethylfurfural was mixed in a flask with 4.6 grams of phenol and sufficient sodium hydroxide added to yield a pH of 11.

The solution was refluxed for 40 minutes and acidified to a pH of about 2 with dilute hydrochloric acid solution. An oily resin separated out, settled to the bottom of the flask, and was recovered by decanting the supernatant liquor. This resin was washed with water, dissolved by adding water with a small amount of sodium hydroxide to a pH of about 6 and the pH then adjusted to 11 by the addition of ammonium hydroxide with stirring. The solution was then centrifuged to remove a small amount of solids and was permitted to stand over night. A Fiberglas mat was coated with a 4 percent solution of the resin, prepared as indicated, to which had been added 6 percent formaldehyde on the basis of the solids content just prior to dipping the mat. The cured Fiberglas mat showed excellent water resistance as well as good alkali resistance.

*Example 3*

500 mls. of crude hydrolysate liquor containing 4 percent solids and approximately 16 grams of hydroxymethylfurfural was mixed with 15.4 grams of phenol and sufficient sodium hydroxide added to yield a pH of 10. The mixture was heated with stirring in an open beaker for 45 minutes at the boiling point following which it was cooled and acidified to a pH below about 2 with dilute sulphuric acid. A very soft fluid resin separated out. The odor of phenol in the filtrate was apparent.

*Example 4*

150 mls. of crude hydrolysate liquor containing 50 percent solids and approximately 60 grams of hydroxymethylfurfural was mixed with 40 grams of phenol and sufficient sodium hydroxide added to yield a pH of 10. The mixture was heated at the boiling point with stirring for 45 minutes following which the mixture was cooled and acidified to a pH below about 2 by the addition of dilute sulphuric acid. A soft fluid resin precipitated which was not self curing but would cure with the addition of formaldehyde.

*Example 5*

100 mls. of crude hydrolysate liquor containing 10 percent solids and approximately 8 grams of hydroxymethylfurfural was mixed with 7 grams of meta-cresol and sufficient sodium hydroxide solution added to yield a pH of 11. The mol ratio of meta-cresol to hydroxymethylfurfural was approximately 1 to 1. The solution was boiled without refluxing for 45 minutes, cooled and acidified to below pH 2 with dilute sulphuric acid. A good yield of soft black resin came out on acidification.

*Example 6*

50 mls. of crude hydrolysate liquor containing 2.8 percent solids and approximately 1.12 grams of hydroxymethylfurfural was mixed with 1.1 grams of resorcinol and 0.1 gram sodium acetate. The solution was boiled without refluxing for 45 minutes. The resultant product was a brown viscous solution soluble in alcohol and was resinous in character.

*Example 7*

Crude hydrolysate liquor having a pH between about 2.5 and 2.9 and containing 40 percent solids was adjusted to a pH of about 2.0 with mineral acid and then mixed with phenol in a mol ratio of about 2 mols of phenol to 1 mol of hydroxymethylfurfural. The mixture was heated at 90° C. for about 1 hour and then steam distilled to remove excess free phenol. A Novalac type resin separated out which was not self curing but which would cure when mixed with 5 to 10 parts of hexamethylenetetramine.

From the above examples it will be apparent that the condensation reaction between hydroxymethylfurfural and a phenol occurs even in dilute solutions (see Examples 1, 3 and 6). It will also be apparent that when the mol ratio of hydroxymethylfurfural to the phenol is less than about 1:1 an excess of free phenol remains in the reaction mixture thereby indicating that all of the phenol has not reacted. (See Examples 1 and 3 in which the mol ratio of hydroxymethylfurfural to phenol is about 0.8:1, and Example 7, where the mol ratio of hydroxymethylfurfural to phenol is about 0.5:1.)

The resins produced herein in alkaline medium may be used in a manner similar to typical phenolic resins. They are particularly efficacious in molding powders and as glass fiber binders and in both of these applications have proved superior to standard phenolic resins. In fiber-glass insulation these resins produce greatly improved water resistance and a stronger bond with considerably lower resin content.

The resins produced in an acid medium are, as indicated, true Novalacs and are used in the same manner. These resins have no tendency to cure or cross-link without the addition of hexamethylenetetramine or other cross-linking agent, but when mixed with 5–10 parts of hexamethylenetetramine provide superior molding resins. They are also readily incorporated in rubber acting as reinforcing and plasticizing agents. When alkylated phenols are employed in accordance with the process of the invention oil soluble resins are produced.

The term "hydrolysate liquor," as used in the claims, refers to the liquid product, including soluble dissolved solids, obtained in the manner hereinabove described, and either in the raw state, as obtained, or in a more concentrated state brought about by evaporation of a portion or all of the water.

The examples herein given are for the purpose of illustration only and are not to be construed as limiting the invention, the scope of which is as defined in the following claims.

I claim:

1. The process of preparing a synthetic resin which comprises reacting hydroxymethylfurfural with a phenol of the class consisting of hydroxybenzene, resorcinol, the cresols, xylenols and crude mixtures thereof under alkaline condensing conditions.

2. The process of preparing a synthetic resin which comprises reacting hydroxymethylfurfural with a phenol of the class consisting of hydroxybenzene, resorcinol, the cresols, xylenols and crude mixtures thereof in a mol ratio from about 1 to about 3 mols of hydroxymethylfurfural to each mol of phenol under alkaline condensing conditions.

3. The process of preparing a synthetic resin which comprises mixing hydroxymethylfurfural with a phenol of the class consisting of hydroxybenzene, resorcinol, the cresols, xylenols and crude mixtures thereof, adding sufficient alkaline material to give a pH of between about 10 and about 11.5 to the mixture, heating the mixture for a period of time from about 10 minutes to about 60 minutes, and neutralizing the mixture with a dilute solution of mineral acid.

4. A process as set forth in claim 3 wherein the phenol is hydroxybenzene.

5. A process as set forth in claim 4 wherein the phenol is m-cresol.

6. A process as set forth in claim 4 wherein the phenol is resorcinol.

7. The process of preparing a synthetic resin which comprises mixing a phenol of the class consisting of hydroxylbenzene, resorcinol, the cresols, xylenols and crude mixtures thereof with hydrolysate liquor obtained by the steam hydrolysis of acid impregnated hexose yielding material at elevated temperatures and pressures and under conditions of time and pH such that the major component of the liquor, aside from the water, is hydroxymethylfurfural, adding sufficient alkaline material to the mixture to yield a pH of from about 10 to about 11.5, heating the mixture for a period of time from about 10 minutes to about 60 minutes, and cooling and acidifying the mixture to precipitate the resinous material.

8. A process as set forth in claim 7 wherein the pH of the hydrolysate liquor is below 3.0.

9. A synthetic resin comprising the reaction condensation product obtained by reacting hydroxymethylfurfural with a phenol of the class consisting of hydroxybenzene, resorcinol, the cresols, xylenols and crude mixtures thereof in an alkaline medium.

10. A synthetic resin comprising the reaction product formed under alkaline conditions of a phenol of the class consisting of hydroxybenzene, resorcinol, the cresols, xylenols and crude mixtures thereof and hydrolysate liquor obtained by the hydrolysis of acid impregnated hexose yielding materials at elevated temperatures and pressures and under conditions of time and pH such that the major component of the liquor, aside from water, is hydroxymethylfurfural.

References Cited in the file of this patent

UNITED STATES PATENTS 1,737,121     Novotny _____ Nov. 26, 1929

FOREIGN PATENTS 583,021     Great Britain _____ Dec. 5, 1946

OTHER REFERENCES

Middendorp: Recueil des Travaux Chemique de Pays-Bas, vol. 38 (1919), pages 49, 54, 55, 68–71.